United States Patent Office 2,891,839
Patented June 23, 1959

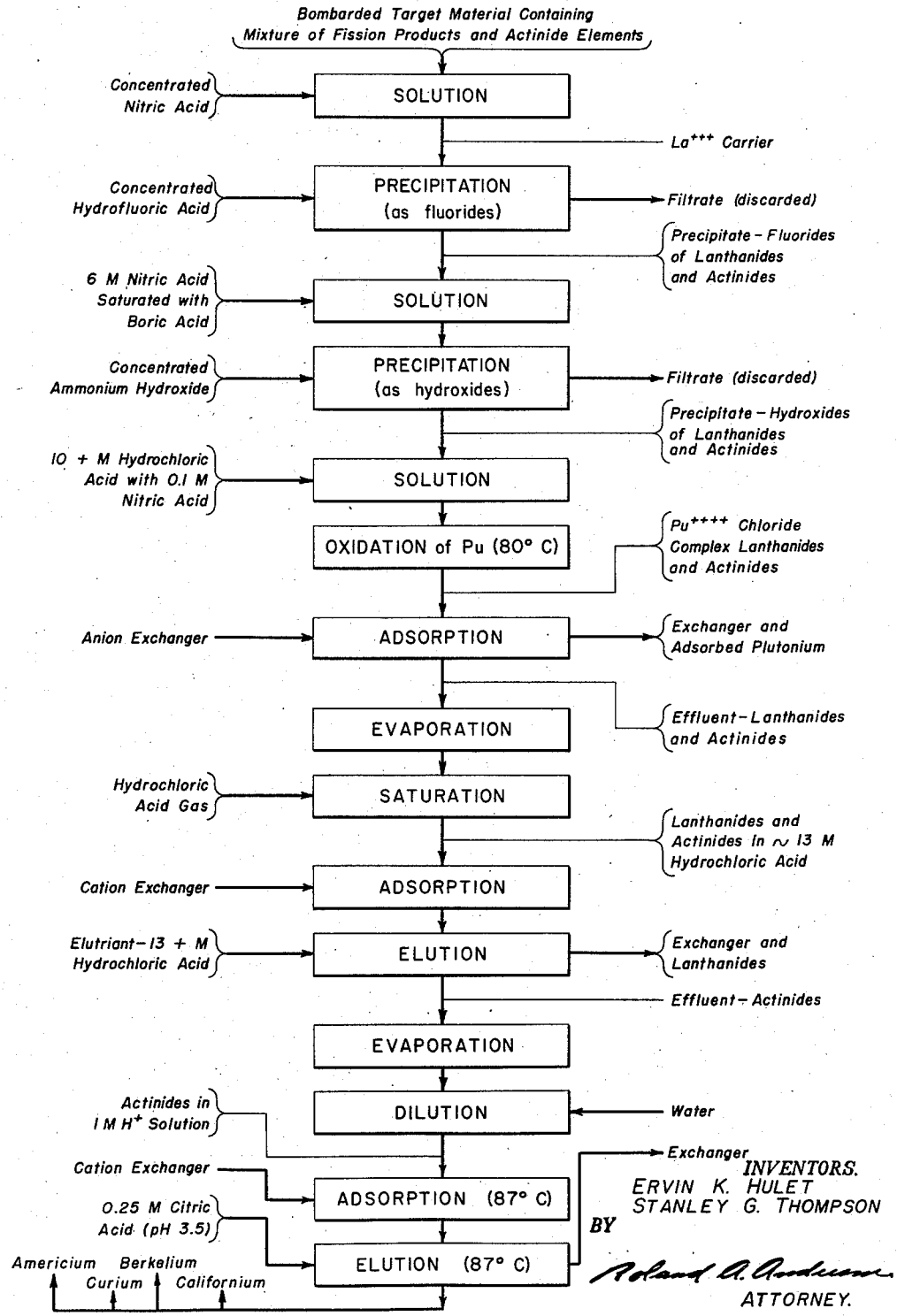

2,891,839

PRODUCTION OF CURIUM 245

Ervin K. Hulet, Walnut Creek, and Stanley G. Thompson, Concord, Calif., assignors to the United States of America as represented by the United States Atomic Energy Commission Application December 31, 1953, Serial No. 401,740

8 Claims. (Cl. 23—14.5)

This invention relates to a new isotope of curium, and methods for producing and purifying the same.

This new isotope of curium has a mass number of 245 with a nuclear composition consisting of an aggregate of 96 protons and 149 neutrons. The isotope decays chiefly by emission of alpha particles with an energy value of 5.37 mev.; its half life is estimated to be ca. 26,000 years as determined by the approximate disintegration rate of berkelium 245 and the alpha particle disintegration rate of curium 245.

The present invention is predicated upon the discovery that the isotope of curium having a mass number of 245, which was heretofore unknown, can be produced by the prolonged and intense neutron irradiation of curium 242 or americium 241 in a chain reacting pile or similar neutron source, or by the alpha particle bombardment of curium 242 in a particle accelerator with subsequent decay, by electron capture, of the berkelium 245 product.

Accordingly, it is an object of the invention to produce the isotope of curium having a mass number of 245.

Another object of the invention is to provide a synthetic isotope of mass number 245 and atomic number 96.

A further object of the invention is to provide methods for producing the isotope of curium having a mass number of 245 and an atomic number of 96.

A still further object of the invention is to provide a method for isolating and purifying the curium isotope having a mass number of 245 and an atomic number of 96 from the crude isotope aggregation containing the same.

The invention as to its characteristics, together with further objects and advantages thereof, will become apparent by reference to the following specification taken in conjunction with the accompanying figure which constitutes a flow sheet illustrating a chemical process of separating and purifying the desired isotope.

With the development of means of particulate bombardment, for example, irradiation in chain-reacting piles and electromagnetic and electrostatic particle accelerators, it has become possible through artificial elemental transmutation to create new primary forms of matter. In the present instance, curium 245 may be produced by one of three alternative methods, i.e., decay of berkelium 245 produced by the alpha bombardment of curium 242 in a particle accelerator according to the reaction:

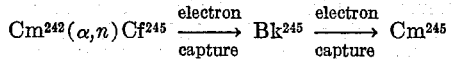

by the prolonged and intense neutron irradiation of curium 242 in a pile or similar neutron source according to the reaction:

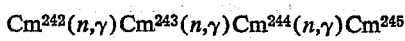

or by such irradiation of americium 241 in said neutron source according to the reaction:

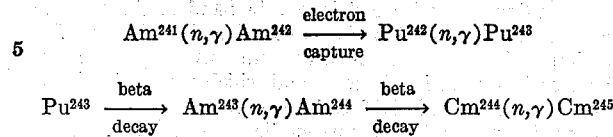

In the process of producing curium 245 by the alpha particle bombardment of curium 242 in a particle accelerator the technique is substantially as follows: A target of the oxide of curium 242, or a mixture thereof with other elements in the actinide series of the periodic system is prepared and bombarded with helium ions in a high energy particle accelerator, producing a nuclear transformation of the curium 242 by the addition of a proton and two neutrons to the nucleus thereof, forming the isotope of berkelium having a mass number of 245 in a state of high purity. This berkelium is then allowed to decay, with electron capture causing conversion of one proton per nucleus to a neutron and thus forming curium 245.

*Example 1*

A one milligram sample of curium 242 as curium nitrate solution was formed into a target by placing a quantity of the curium nitrate in a grooved platinum dish of 0.5 square centimeter area, then removing the water under an infrared heat lamp and igniting the residue to form the black curium 242 oxide. The dish containing the curium oxide was then bombarded with a beam of 34 mev. positively charged helium nuclei from a cyclotron with a total bombardment of 60 microampere hours. After bombardment, the curium oxide sample, which now contained the berkelium 245 isotope, which subsequently decays by electron capture to curium 245, in admixture with curium 242, 243, and 244, was dissolved from the target in 5 milliliters of concentrated nitric acid. About one milligram of La$^{+++}$ carrier was added and the solution was made 3 molar in hydrofluoric acid and nitric acid to precipitate the lanthanides and actinides as their fluorides. The fluoride precipitate was separated by centrifugation and dissolved in 3 milliliters of 6 M nitric acid saturated with boric acid. The solution was made basic with ammonium hydroxide and the lanthanides and actinides were precipitated as their hydroxides. The precipitated hydroxides were separated by centrifugation and dissolved in 3 milliliters of 10+ molar hydrochloric acid. Two to three drops of concentrated nitric acid were added to the resultant solution to oxidize any plutonium present to a valence state of +4, and the mixture was heated to approximately 80° C., the plutonium forming a negative chloride complex with the chloride ion. This complex was adsorbed on a column of Dowex A-1, an anion exchange resin which is described in Ind. and Eng. Chem., vol. 43, 1951, pp. 1088–1093, and which was 5 millimeters in diameter and 5 centimeters long. Dowex A-1 which is now sold under the trademark Dowex 1 is a strongly basic anion exchange which is stated by the manufacturer to be manufactured by procedures which are substantially the same as those described in Examples 2 and 4 of U.S. Patent No. 2,614,099, filed December 29, 1948, and issued October 14, 1952. The elutriant from the column containing the lanthanide-actinide mixture was evaporated to a volume of less than 200 microliters, and the hydrochloric acid concentration of the solution was adjusted to greater than 13 molar by the addition of hydrochloric acid gas. The positive ions of this solution were contacted with a column of colloidal Dowex 50 cation exchange resin which was 10 centimeters long and 10 millimeters in diameter, eluting the actinides and retaining the lanthanides. After evaporation of the solvent from the eluted actinide fraction to a very small volume on a hot plate, and redilution of this fraction with water to a volume of about 250 microliters and less than 1 molar hydrogen ion concentration, the solution was adsorbed in a thin band at the top of a column of ammonium form, spherical fines Dowex 50 cation exchange resin, which column was 18 centimeters long and 14 mm. in diameter and which was maintained at a temperature of 83.7° C. by passing ethylene chloride vapor through a jacket surrounding the column. The actinides were eluted from the column in reverse order of their atomic numbers with 0.25 M citric acid at a pH value of 3.5, californium eluting first, followed by berkelium, curium, and finally, americium.

Curium 245 may alternatively be produced by neutron irradiation of curium 242 or americium 241 in substantially the following manner: A target of the oxide of curium 242 or americium 241, or a mixture thereof with other elements in the actinide series of the periodic system is prepared and bombarded with slow neutrons in a nuclear chain reactor or other appropriate neutron source. When americium 241 is bombarded, a neutron is added to the nucleus to form americium 242 which is converted by electron capture to plutonium 242. The plutonium 242 is converted by beta decay to americium 243. Bombardment adds a neutron to the nucleus of the americium 243, forming americium 244 which is converted by beta decay to curium 244. The nucleus of the curium 244 gains a neutron under bombardment to produce curium 245. If curium 242 is the target material, three neutrons are added by the bombardment to the nucleus of the curium 242 to successively form curium 243, then curium 244, and finally, curium 245. This latter method of producing curium 245 may be illustrated by the following example.

Example 2

A 180 microgram sample of the oxides of a mixture of curium 242, 243, 244 were subjected to intense neutron irradiation in a slow neutron chain reactor for about one year at a neutron flux of greater than $10^{13}$ neutrons/cm.$^2$/sec. The sample, consisting of 15-20 micrograms of the mixed irradiation product comprising curium 242, 243, 244, and 245, was withdrawn from the reactor, dissolved in 20 milliliters of concentrated nitric acid and purified by the process described in Example 1. Mass spectrograph analysis of the purified product showed the separation of the isotope of curium having a mass number of 245.

As is shown in the figure and illustrated in the preceding Example 1, the resultant isotopic product from the process of alpha bombardment of curium 242 with subsequent decay of the product, $Bk^{245}$, by electron capture, or of the neutron irradiation of curium 242 or americium 241, may be purified for separation of the curium 245 by dissolving these bombarded products containing the desired curium 245 isotope in concentrated nitric acid, adding a quantity of a trivalent salt of lanthanum as a carrier for the positively trivalent and tetravalent actinides and lanthanides, making the solution three molar in hydrofluoric acid to precipitate the lanthanides and actinides as their fluorides, and separating the precipitate from the solution by centrifugation or filtration. This precipitate is then dissolved in 6 molar nitric acid saturated with boric acid and the solution is made basic with ammonium hydroxide to precipitate the metals as their hydroxides. This precipitate is separated from the solution by centrifugation, filtration, or other means and, after dissolving the precipitate in greater than 10 molar hydrochloric acid, sufficient concentrated nitric acid is added to make the solution 0.1 M in nitric acid and to oxidize any plutonium present to a positive tetravalent state. The mixture is heated to approximately 80° C., forming a negative chloride complex with the plutonium which is adsorbed on a column of anion exchange resin such as Dowex A-1, a quaternary ammonia type exchanger. The solvent from the eluted solution, containing a plutonium-free mixture of the actinides and lanthanides is evaporated to a relatively small volume and the solution is saturated with hydrochloric acid gas. The positive ions of this solution are adsorbed on a suitable column of a cation exchange medium such as colloidal Dowex 50, a sulfonated aromatic hydrocarbon polymer, and the actinides are eluted therefrom with hydrochloric acid which is greater than 13 molar in concentration. More specifically, Dowex 50 is a sulfonated aromatic hydrocarbon of the type described by D'Alelio in U.S. Patent 2,366,007. Further information on such cation exchanger is presented beginning at page 2830, vol 69 of the Jour. Amer. Chem. Soc., 1947. After reducing the solution to relatively small volume by evaporating the water therefrom, and adjusting the solution to 1 molar in hydrogen ion concentration by adding water thereto, the resultant solution is adsorbed on a column of cation exchange resin such as spherical Dowex 50, which resin column is maintained at a temperature of 87° C. by passing ethylene chloride vapor through a jacket surrounding the column. A 0.25 molar solution of citric acid at a pH value of 3.5 is placed on the column and elutes the actinides in order of their decreasing atomic number; californium is eluted first, then berkelium, curium, and americium.

In the production of curium 245 by the alpha bombardment of curium 242 to californium 245, with subsequent decay by electron capture to berkelium 245 and then to curium 245, the almost complete decay of the lighter isotopes of berkelium by the end of the last separation step of the purification process, supra, leaves nearly pure berkelium 245. The decay of this isotope by electron capture results in the formation of almost pure curium 245. This isotope may be identified by an alpha particle pulse analysis of the emitted helium nuclei.

The purified product from the neutron bombardment of the curium 242 or americium 241 in a slow neutron reactor consists of a mixture of the curium 245 with other actinide isotopes. The curium 245 isotope is separated from the other curium isotopes on the basis of relative mass criteria in a mass spectrometer or similar apparatus.

From the chemical separation and characterization, the pulse analysis or mass spectrographic analysis, and the radiation characteristics, the new isotope can be said with a high degree of certainty to be curium 245.

While there has been described what is, at present, considered to be the preferred embodiment of the invention, it will be understood that various modifications may be made therein, and it is intended to cover all such modifications as fall within the scope of the appended claims.

What we claim is:

1. In a process for separating curium isotope 245 from a mixture produced by the irradiation of a transuranium element, the steps comprising producing a concentrated nitric acid solution of said mixture together with trivalent lanthanum, adding hydrofluoric acid to said solution to precipitate lanthanum fluoride to carry lanthanide and actinides therefrom, dissolving the precipitate in a mixture of nitric and boric acids, precipitating lanthanides and actinides from the solution with ammonium hydroxide, dissolving the precipitate in a mixture of nitric and hydrochloric acids, adsorbing plutonium chloride complexes from the solution by contact with an anion exchange resin, saturating the residual solution with hydrochloric acid, then contacting the solution with a cation exchange resin column to adsorb remaining actinides and lanthanides, eluting the actinides with concentrated hydrochloric acid, reducing the HCl concentration of the eluate solution to less than 1 M, then adsorbing the actinides from the solution by contact with a column of cation exchange resin, chromatographically eluting the actinides from the column with a citric acid solution, and collecting the fraction of eluate containing curium isotope 245.

2. A method for separating the isotope of curium having a mass number of 245 from a mixture thereof with other elements in the actinide and lanthanide series comprising dissolving the mixture in concentrated nitric acid, adding to the solution a trivalent salt of lanthanum, adding hydrofluoric acid to the solution whereby the lanthanum fluoride precipitates from the solution, carrying with it the actinides and lanthanides, separating the precipitate from the filtrate, dissolving the precipitate in 6 molar nitric acid which is saturated with boric acid, adding ammonium hydroxide to the solution thereby precipitating the actinides and lanthanides as their hydroxides, separating the precipitate from the filtrate, dissolving the precipitate in greater than 10 molar hydrochloric acid, adding nitric acid to the solution to a concentration of 0.1 molar, thereby oxidizing the plutonium present to the tetravalent state, heating the solution to 80° C., contacting the solution with a column of anion exchange resin to adsorb the plutonium as a chloride complex thereon, concentrating the effluent solution by partially evaporating the solvent, saturating the solution with hydrochloric acid gas, contacting the solution with a column of colloidal cation exchange resin, washing the resin column with greater than 13 molar hydrochloric acid thereby eluting the adsorbed actinides, concentrating the solution by evaporating most of the solvent therefrom, diluting the solution with water to 1 molar hydrogen ion concentration, adsorbing the actinide solution on a spherical cation exchange resin which is maintained at a temperature of 80–90° C., washing the column with a 0.25 molar eluant solution of citric acid at a pH value of 3.5, and collecting the eluted curium fraction.

3. The process as defined in claim 2 wherein said mixture of curium isotope 245 and other elements is produced by the irradiation of curium isotope 242 with energetic alpha particles.

4. The process as defined in claim 2 wherein said mixture of curium isotope 245 and other elements is produced by the irradiation of a curium 242 target with above about 60 microampere hours per 0.5 sq. cm., of alpha particles of about 34 mev. energy.

5. The process as defined in claim 2 wherein said mixture of curium isotope 245 and other elements is produced by the irradiation of separated and purified curium isotope 242 for a long period of time with a neutron flux greater than $10^{13}$ neutrons/cm.$^2$/sec.

6. The process as defined in claim 2 wherein said mixture of curium isotope 245 and other elements is produced by the irradiation of separated and purified curium isotope 242 for about one year with a neutron flux greater than $10^{13}$ neutrons/cm.$^2$/sec.

7. The process as defined in claim 2 wherein said mixture of curium isotope 245 and other elements is produced by the irradiation of americium 241 for a long period of time with a neutron flux greater than $10^{13}$ neutron/cm.$^2$/sec.

8. The process as defined in claim 2 wherein said mixture of curium isotope 245 and other elements is produced by the irradiation of americium 241 for about one year with a neutron flux greater than $10^{13}$ neutrons/cm.$^2$/sec.

References Cited in the file of this patent

UNITED STATES PATENTS 2,683,655   Peppard _____ July 13, 1954

OTHER REFERENCES

Hulet et al.: "Physical Review," vol. 84, pp. 366–7 (1951).

Hulet: U.S. Atomic Energy Commission Publication No. UCRL–2283, July 1953, 43 pages.

Thompson et al.: "Physical Review," vol. 93, page 908 (1954), February 15.

Seaborg: "Chemical and Engineering News," vol. 25, pp. 358–360, 397 (1947). Lecture presented at Rochester, N.Y., November 18, 1946.

Emelius: "Science Progress," vol. 38, pp. 609–621 (1950).

Thompson et al.: "Physical Review," vol. 80, pp. 781–796 (1950).

Ghiorso et al.: "Physical Review," vol. 78, p. 472 (1950).

Glasstone: "Sourcebook on Atomic Energy," pp. 273–275 (1950). Publ. by D. Van Nostrand Co., N.Y.